United States Patent [19]

Schütz et al.

[11] Patent Number: 4,880,656

[45] Date of Patent: Nov. 14, 1989

[54] PROCESS FOR THE DEAROMATIZING AND REAROMATIZING TEA

[75] Inventors: Erwin Schütz, Trostberg; Heinz-Rüdiger Vollbrecht, Stein/Traun, both of Fed. Rep. of Germany

[73] Assignee: SKW Trostberg Aktiengesellschaft, Trostberg, Fed. Rep. of Germany

[21] Appl. No.: 319,931

[22] Filed: Mar. 6, 1989

Related U.S. Application Data

[63] Continuation of Ser. No. 126,416, Nov. 30, 1987, abandoned.

[30] Foreign Application Priority Data

Nov. 29, 1986 [DE] Fed. Rep. of Germany ....... 3640967

[51] Int. Cl.$^4$ ................................................ A23F 3/42
[52] U.S. Cl. .................................... 426/386; 426/597; 426/322
[58] Field of Search ......................... 426/386, 597, 322

[56] References Cited

U.S. PATENT DOCUMENTS

| | | | |
|---|---|---|---|
| 2,085,489 | 6/1937 | Baruth | 426/386 X |
| 2,476,072 | 7/1949 | Tressler | 426/597 |
| 3,148,070 | 9/1964 | Meshkin et al. | 426/386 |
| 3,532,506 | 10/1970 | Rey et al. | 426/386 X |
| 3,717,472 | 2/1973 | Strobel et al. | 426/597 X |
| 4,130,669 | 12/1978 | Gregg | 426/386 X |
| 4,167,589 | 9/1979 | Vitzhum et al. | 426/386 X |

*Primary Examiner*—Joseph Golian
*Attorney, Agent, or Firm*—Felfe & Lynch

[57] ABSTRACT

The present invention provides a process for the dearomatizing and subsequent rearomatizing of black or green tea, wherein
(a) the volatile aroma components are removed from the moist tea with a moist inert gas at a temperature of from 60° to 95° C. by means of a carrier gas distillation,
(b) the water is selectively removed from the moist, inert gas stream containing the volatile aroma components and
(c) subsequently, for rearomatizing, the volatile aroma components are passed through dry tea to be aromatized with the dry inert gas stream.

15 Claims, No Drawings

PROCESS FOR THE DEAROMATIZING AND REAROMATIZING TEA

This application is a continuation of application Ser. No. 126,416, filed Nov. 30, 1987, now abandoned.

The present invention relates to a process for the dearomatising and subsequent rearomatising of black and green tea.

Such a process is of special interest for the production of decaffeinated black tea, because the decaffeination of fermented tea usually causes problems with the aroma substances (change of the aroma profile). For this reason, it is very suitable first to remove the volatile aroma components from the tea, then to decaffeinate the tea and again subsequently to impregnate the tea with the aroma components which have been removed.

These problems arise more or less not only in the case of the use of organic solvents for decaffeination but also in the case of decaffeination with compressed gases.

The dearomatising of tea, i.e. the removal of volatile aroma components, is known and is used technically for the production of instant teas. For the removal of the volatile aroma components, it is preferred to use either steam or vacuum distillation. Disadvantages of steam distillation are the relatively high temperatures in use, which can very easily degrade the temperature-sensitive aroma components as well as the technically laborious processes for the subsequent reconcentration of the aroma components. In general, this takes place also during the extraction with organic solvents. Furthermore the complete removal of the solvents can rise considerable problems.

Vacuum distillation is also technically laborious, not only with regard to the apparatus but also with regard to the subsequent condensation of the aroma substances at very low temperatures. In Federal Republic of Germany Patent Specification No. 21 27 642, a multistep process is described in which, in a first process step, the aroma substances are removed from the dry black tea with dry, supercritical carbon dioxide, subsequently, in a second step, the caffeine is selectively extracted with moist, supercritical carbon dioxide and finally the separated aroma substances are again reimpregnated into the tea. However, it has been shown that, in the first step, the aroma substances cannot be completely removed with this procedure, consequently during the subsequent decaffeination, aroma displacements nevertheless happen. A further disadvantage is the relatively expensive removal of the aroma substances with supercritical gases.

Therefore, it is an object of the present invention to provide a process for the dearomatising and subsequent rearomatising of black and green tea which does not suffer from the mentioned disadvantages of the prior art and which makes it possible to transfer aroma components practically completely.

Thus, according to the present invention, there is provided a process for the dearomatising and subsequent rearomatising of black or green tea, wherein (a) the volatile aroma components are removed from moist tea with a moist inert gas at a temperature of from 60° to 95° C. by means of carrier gas distillation, (b) the water is selectively removed friom the moist, inert gas stream containing the volatile aroma components and (c) subsequently, for rearomatising, the volatile aroma components are passed through dry tea in order to aromatise the tea with the dry inert gas.

Surprisingly, it has been shown that the process according to the present invention is able to result in a practically complete dearomatisation of the tea without a damage to the aroma substances and that the subsequent rearomatising results in good organoleptic properties. This was particularly surprising because, as is known, the aroma components of tea need a sensitive treatment.

For the process of the present invention, the tea to be treated is first moistened preferably to a moisture content of 15 to 40% by weight. The moisture content can be adjusted, without problems, by the addition of necessary quantity of water to the dry tea into an appropriate blending device and subsequent blending until a uniform distribution of the moisture has resulted. Tea is understood to be tea leaves and products produced therefrom by comminution, compacting and the like.

The wetted tea thus obtained is then subjected to a carrier gas distillation, the volatile aroma components of the tea thereby being removed by distillation with a moist inert gas stream. The carrier gas distillation, which is preferably carried out at normal pressure and with technically conventional apparatus, is preferably carried out at 60° to 90° C. and more preferably at 70° to 80° C. in order to protect the aroma substances. However, higher pressures can also be used.

It is important for the present invention that the carrier gas distillation is carried out by means of a moist inert gas because only by this way a chemical damage of the aroma substances is excluded.

An inert gases according to the present invention, there are to be understood those gases which, in the case of the given distillation temperatures, do not bring any alternation of the volatile aroma components and which are acceptable from the health point of view. Such gases include, in particular, nitrogen, carbon dioxide and the noble gases, for example argon.

The relative moisture content of the inert gases used should be more than 60% and preferably from 80 to 95%.

The amount of inert gas used can be varied within wide ranges and is preferably from 100 to 5000 liters of inert gas per 100 g. of tea used.

In a preferred embodiment of the process according to the present invention, during the carrier gas distillation, the inert gas stream which contains the volatile aroma components is passed through a contact zone with copper surfaces, specifically through copper turnings. It has been proven by this procedure that, undesired faulty aromas resulting due to the temperature and moisture can be avoided in the rearomatised tea. This process variant is especially recommended for distillation temperatures above 80° C. The copper turnings, which preferably have a particle size of from 1 to 5 mm., are used, for example, in an amount of from 1 to 100 g. per kg. of tea. Other forms of copper, for example pipes made of copper or with copper surfaces, can also be used.

By passing through the distillation zone in the second stage of the process, water is selectively removed from the inert gas stream containing the volatile aroma components. Thus, it is possible substantially to condense the water from the moist gas carrying the aroma components and, after separation of the water, again to heat the remaining mixture of inert gas and aroma components.

The condensation of the water is preferably achieved by lowering the temperature to below 50° C. and more preferably to 25° to 45° C. The temperature difference between the distillation temperature and the condensation temperature should not exceed about 40° C. because otherwise there is a possibility that water is separated together with the aroma components.

After separation of the water, the remaining mixture or inert gas and aroma components are again heated, preferably by 20° to 40° C.

According to a further variant of the process according to the invention, it is possible to achieve a selective removal of water by only partially condensing the water and removing the residual moisture from the inert gas-aroma mixture by adsorption on water-binding agents.

The partial condensation can be carried out, for example, at a temperature of from 50° to 60° C., a considerable part of the water thereby being condensed but no aroma components. Subsequently, the inert gas-aroma mixture with its residual water content is passed through a layer of a water-binding agent. The water-binding agent must be selected that only water is adsorbed but no aroma components. Molecular sieves and anhydrous sodium sulphate have been proven to be useful for that purpose and are preferred adsorbents.

After the selective removal of water, the rearomatising step (c) is carried out. For example, the tea which has been dearomatised in step (a) and decaffeinated with compressed gases or other solvents, such as methylene chloride, ethyl acetate or water in step (b), is rearomatised with the aroma components of step (a) in step (c). Of course also other tea than that obtained in step (a) can be used for step (c). For this purpose, the inert gas-aroma material mixture is either mixed uniformly and intensively with the tea to be aromatised or is passed through it. The tea to be aromatised has to be in a dry state, i.e. with a water content not exceeding 10% by weight, in order to achieve an optimal rearomatisation. Therefore, the dearomatised tea obtained in step (a) must be dried before the rearomatisation (and possibly after the decaffeination), which can be carried out without problems with the use of conventional technical processes since no impairment of the aroma profile thereby occurs.

The present invention is expecially suitable for a continuous process since the inert gas, after the rearomatising, can, without further purification steps, be recycled to the distillation step after moistening and possibly heating.

The rearomatised tea obtained by the process according to the present invention is characterised by its good organoleptic properties and is, in this regard, markedly superior to a tea obtained by a conventional decaffeination process. However, the process of the present invention is also, in general, suitable for strengthening or influencing the aroma of tea from any desired pretreatments.

The following examples are given for the purpose of illustrating the present invention and do not limit the present invention to those specific examples. Thus other embodiments within the spirit and scope of the invention will suggest themselves to those skilled in the art.

EXAMPLE 1

70 g. of black tea were moistened with water to a moisture content of 30% by weight and subjected to a carrier gas distillation at 80° C. in a distillation apparatus for 2 hours with a total of 1000 liters of nitrogen which had been moistened with water to a relative humidity of about 90%. The gas carrying the aroma substances was passed over a contact path containing 20 cm. of copper turnings and afterwards cooled to 40° C. for the condensation of the water. After separation of the condensed water, the gas stream was heated to 55° C. and passed through a packing of 70 g. of dearomatised tea with a moisture content of 6% by weight which had been previously decaffeinated with supercritical carbon dioxide and subsequently again heated, saturated with water and returned to the distillation step.

The rearomatised tea was tasted in comparison with the decaffeinated and dearomatised tea and was found to be clearly preferable thereto.

EXAMPLE 2

70 g. of black tea were moistened with water to a moisture content of 30% by weight and subjected to a carrier gas distillation at 70° C. in a distillation apparatus for 3 hours with 1500 liters of nitrogen which had been moistened with water to a relative humidity of about 90%. The gas carrying the aroma components was passed over a contact path containing 20 cm. of copper turnings and cooled to 30° C. for the condensation of the water. After separation of the water, the gas stream was heated to 50° C. and passed through a packing of 70 g. of tea which had been dearomatised as in Example 1 and subsequently decaffeinated with supercritical carbon dioxide. The moisture content of this tea was 6.5%. After passing through this tea packing, the circulating gas was again heated and saturated with water.

The rearomatised tea was tasted in comparison with the tea used, which had been dearomatised and decaffeinated as in Example 1, and found to be clearly preferable thereto.

EXAMPLE 3

70 g. of black tea were moistened with water to a moisture content of 30% by weight and subjected to a carrier gas distillation at 90° C. in a distillation apparatus for 1.5 hours with 600 liters of nitrogen which had been moistened with water to a moisture content of about 85%. The gas carrying the aroma components was passed over a contact path containing 20 cm. of copper turnings and cooled to 40° C. for condensation of the water. After separation of the condensed water, the gas stream was heated to 60° C. and passed through a packing of 70 g. of dearomatised tea which had been previously decaffeinated with ethyl acetate. This tea had a moisture content of 6% by weight. After passing through the tea layer, the gas was again heated and saturated with water.

The rearomatised tea was clearly preferred to the tea used, which had been decaffeinated with ethyl acetate, in a comparative tasting.

EXAMPLE 4

The aroma of 70 g. of tea was transferred to 70 g. of decaffeinated and dearomatised tea analogously to the conditions of Example 1. However, in contradistinction to Example 1, the nitrogen stream was not cooled for the condensation of the water present therein and thereafter again heated but was merely cooled to 60° C., the water thereby condensed separated off, then passed through a packing of 1000 g. of molecular sieve material and subsequently passed through 70 g. of dearomatised tea which had been decaffeinated with carbon dioxide.

The rearomatised tea was tasted in comparison with the dearomatised tea used and was found to be clearly preferable thereto.

We claim:

1. A process for the dearomatising and subsequent re-aromatising of black or green tea comprising
   (a) removing the volatile aroma components from moist tea with a moist inert gas with a relative moisture content of 80–95% at a temperature of from 60° to 95° C. by means of carrier gas distillation, wherein at temperatures above 80° C. a contact zone with copper surfaces is used,
   (b) selectively removing the water from the moist, inert gas stream containing the volatile aroma components and
   (c) subsequently passing the volatile aroma components through dry tea allowing the dry tea to be aromatised with the dry inert gas stream.

2. The process of claim 1, wherein the moist tea has a water content of from 15 to 40% by weight.

3. The process of claim 1 or 2, wherein the carrier gas distillation is carried out at a temperature from 70° to 80° C.

4. The process of claims 1 or 2, wherein nitrogen is used as the inert gas.

5. The process of claims 1 or 2, wherein from 100 to 5000 liters of inert gas are used per 100 g. of tea.

6. The process of claim 1, wherein the copper surfaces are provided by copper turnings.

7. The process of claim 6, wherein 1 to 100 g. of copper turnings are used per 1 kg. of tea.

8. The process of claims 1 or 2, wherein the water is selectively separated from the moist inert gas stream carrying the aroma components by condensation at temperatures of less than 50° C. and the inert gas-aroma material mixtures are subsequently heated to 20° to 40° C.

9. The process of claim 8, wherein the condensation of the water is carried out at a temperature of from 25° to 45° C.

10. The process of claims 1 or 2, wherein the selective separation of the water from the insert gas is carried out by partial condensation and subsequent adsorption of non-condensed water on a water-binding agent.

11. The process of claim 10, wherein the partial condensation is carried out at a temperature of from 50° to 60° C.

12. The process of claim 10, wherein a molecular sieve material is used as a water-binding agent.

13. The process of claims 1 or 2, wherein the dry tea to be aromatised has, in the case of the rearomatisation, a moisture content of less than 10% by weight.

14. The process of claims 1 or 2, wherein the dearomatisation and aromatisation of tea is carried out continuously.

15. The process of claims 1 or 2, wherein caffeine is removed from the tea with conventional solvents after dearomatising and before rearomatising.

* * * * *